United States Patent
Namioka

(10) Patent No.: US 6,419,366 B1
(45) Date of Patent: Jul. 16, 2002

(54) IMAGE DISPLAY DEVICE

(75) Inventor: Makoto Namioka, Nishinomiya (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/576,768

(22) Filed: May 24, 2000

(30) Foreign Application Priority Data

May 28, 1999 (JP) ............................................ 11-149816

(51) Int. Cl.$^7$ ............................................... G02B 27/00
(52) U.S. Cl. ........................ 359/601; 359/602; 359/608; 359/229
(58) Field of Search ................ 359/601, 602, 359/608, 609, 613, 228, 229, 230, 232

(56) References Cited

U.S. PATENT DOCUMENTS

| | | | | |
|---|---|---|---|---|
| 5,774,303 A | * | 6/1998 | Teng et al. .................. | 360/103 |
| 5,847,795 A | * | 12/1998 | Satoh et al. .................. | 349/137 |
| 6,077,472 A | * | 6/2000 | Kataoka et al. .............. | 264/338 |
| 6,120,152 A | * | 9/2000 | Nakayama et al. ........... | 353/31 |

FOREIGN PATENT DOCUMENTS

| | | |
|---|---|---|
| JP | 63-298201 | 12/1988 |
| JP | 9-193332 | 7/1997 |
| JP | 9-193333 | 7/1997 |
| WO | 95/31737 | 11/1995 |

\* cited by examiner

Primary Examiner—Mohammad Sikder
(74) Attorney, Agent, or Firm—Sughrue, Mion, Zinn, Macpeak & Seas, PLLC

(57) ABSTRACT

An image display device is provided which comprises an antiglare surface having unevenness and pixels having a minimum pixel pitch (a) of about 10 to about 100 μm, wherein a ratio (Sm/a) of an average spacing of roughness peak (Sm) of said unevenness to the minimum pixel pitch (a) is about 0.4 or smaller. In the image display device, the generation of "glittering" can be restrained.

11 Claims, 3 Drawing Sheets

IMAGE DISPLAY DEVICE

BACKGROUND OF THE INVENTION

1. Field of the Invention

The present invention relates to an image display device, and more particularly, to an image display device which comprises an antiglare surface having unevenness and pixels having a pixel pitch of about 10 to about 100 μm.

2. Description of the Related Art

With regard to image display devices, density of displayed image has recently increased year by year even in a small image display device having a small display area. For example, as for small image display devices having a display screen of 2.5 inch size, image display devices having 180,000 or more pixels have been developed as well as conventional ones having about 80,000 pixels. As for image display devices performing a color display, a pixel pitch (a) of image display devices having about 180,000 pixels is about 60 μm, while the pixel pitch (a) of image display devices having about 80,000 pixels is generally about 80 to about 100 μm. Here, a pixel pitch (a) is a distance between adjacent pixels and refers to the minimum one of the longitudinal and lateral dimensions of individual pixels forming an image. In the case of image display devices performing a color display, the pixel pitch (a) represents the minimum one of the longitudinal and lateral dimensions (a and b) of individual pixels (7R, 7G and 7B) that respectively indicate R(red), G(green), or B(blue) (See, FIG. 1).

On the other hand, an image display device which has an antiglare surface having unevenness on the utmost surface thereof has been known for preventing the surrounding scenery from showing up in the screen thereof. An image display device possessing such an antiglare surface has advantages in that visibility of displayed images is good since the surrounding scenery showing up on the utmost surface thereof is diffused and reflected by the unevenness of the utmost surface, and is not recognized as an image.

However, when the antiglare surface having unevenness is disposed on the utmost surface in an image display device having a pixel pitch (a) of smaller than about 100 μm, a so-called "glittering (scintillation)" is generated in some cases, thereby sometimes leading to decrease in clearness of images. Such "glittering" lowers the visibility of displayed images.

SUMMARY AND OBJECTS OF THE INVENTION

The inventors of the present invention have devoted intensive efforts to restrain the "glittering" generated in image display devices which comprises an antiglare surface having unevenness and pixels having a pixel pitch (a) of smaller than about 100 μm. As a result, the inventors of the present invention have found that in image display devices which comprises pixels having such a pixel pitch (a), the generation of "glittering" can be restrained when a ratio of an average spacing of roughness peak (Sm) of the unevenness on the antiglare surface to the pixel pitch (a) is a specific value or smaller. Thus the inventors have accomplished the present invention.

The present invention provides an image display device which comprises an antiglare surface having unevenness and pixels having a minimum pixel pitch (a) of from about 10 to about 100 μm, wherein a ratio (Sm/a) of an average spacing of roughness peak (Sm) of the unevenness to the minimum pixel pitch (a) is about 0.4 or smaller.

DETAILED DESCRIPTION OF THE INVENTION

An image display device of the present invention comprises an antiglare surface having unevenness and pixels having a minimum pixel pitch (a) of from about 10 to about 100 μm. A ratio (Sm/a) of an average spacing of roughness peak (Sm) of the unevenness to the minimum pixel pitch (a) is about 0.4 or smaller. Here, the pixel pitch (a) is a distance between adjacent pixels and refers to the minimum one of the longitudinal and lateral dimensions of individual pixels forming an image. The average spacing of roughness peak (Sm) of the unevenness is defined in JIS (Japanese Industrial Standard) B0601-1994 and is approximately the same as an average distance between adjacent each convexity which constitutes the unevenness.

Figure 1:
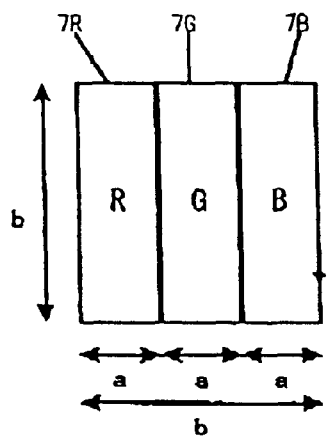
FIG. 1 is a partial model view showing longitudinal and lateral dimensions of individual pixels that indicate R(red), G(green) and B(blue) in an image display device performing a color display.
Figure 2:
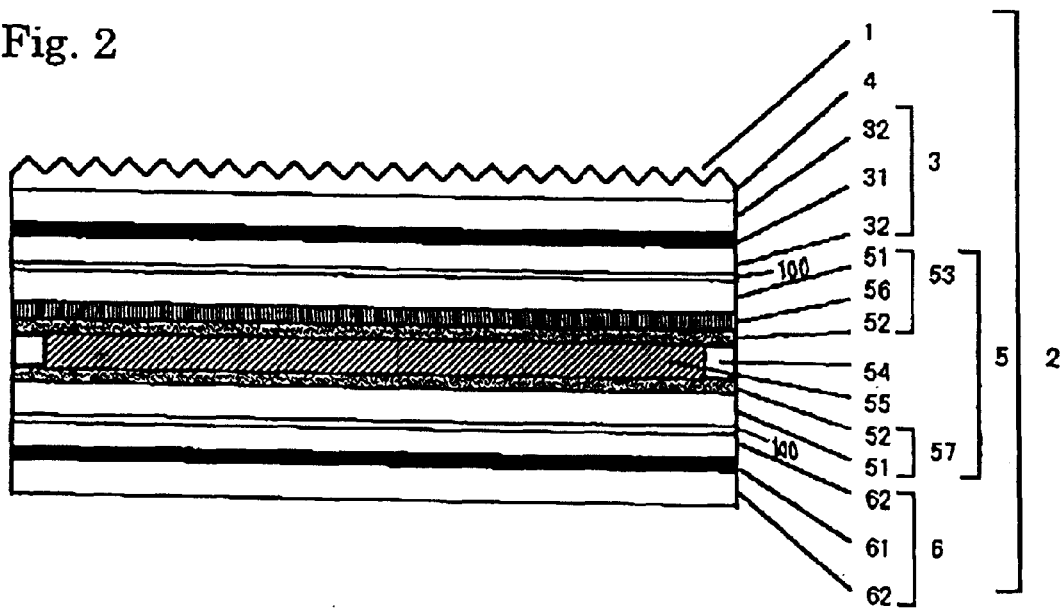
FIG. 2 is a cross sectional view of one example of an image display device of the present invention.

FIG. 2 shows one example of an image display device of the present invention. The image display device 2 in FIG. 2 has a linear polarizing plate 3 and a liquid crystal cell 5 in this order in the direction from the front surface side to the rear surface side of the device, and is generally referred to as a "liquid crystal display devices". Here, the front surface side means the side facing an observer that observes the device.

The linear polarizing plate 3 (which is disposed on the front surface side of the liquid crystal cell 5) is obtained, for example, by respectively laminating a protective film 32 on both surfaces of a polarizer film 31. Examples of the polarizer film 31 include a film of polyvinyl alcohol resin (PVA) in which iodine or a dichromatic dye is adsorbed and oriented. The polarizer film 31 has a thickness, for example, of about 15 to about 30 μm. Examples of the protective film 32 include a film of a cellulose resin such as triacetylcellulose (TAC) or diacetylcellulose (DAC). The protective film 32 has a thickness, for example, of about 50 to about 150 μm. The polarizer film 31 and the protective film 32 may be laminated with each other through a polyvinyl alcohol pressure sensitive adhesive layer 100.

The liquid crystal cell 5 (which is disposed on the rear surface side of the linear polarizing plate 3) is, for example, a cell in which "transparent substrates with transparent electrodes" 53, 57 made of a transparent electrically conductive layer 52 and a transparent substrate 51 are disposed through a spacer 54 so that the transparent conductive layers 52 face each other, and a liquid crystal layer 55 is interposed between these two substrates 53, 57 with electrodes. This liquid crystal cell 5 may be a TN (twisted nematic) type or a STN (super twisted nematic) type.

The minimum pixel pitch (a) of individual pixels constituting the liquid crystal layer 55 is about 10 to about 100 μm, and preferably about 20 to about 100 μm.

Further, as for the liquid crystal cell 5 shown in FIG. 2, a color filter 56 is disposed between the transparent conductive layer 52 and the transparent substrate 51 (which is disposed on the front surface side of the liquid crystal cell 5), whereby color images can be displayed.

The linear polarizing plate 3 is laminated on the front surface side of the liquid crystal cell 5 typically through a transparent adhesive layer 100. Examples of the adhesive constituting the adhesive layer include a pressure sensitive adhesive (sticking agent) such as an acrylic pressure sensitive adhesive or a urethane pressure sensitive adhesive The adhesive layer may have a thickness of from about 15 to about 40 µm.

Further, a retardation plate (not illustrated) may be disposed between the linear polarizing plate 3 and the liquid crystal cell 5 for the purpose of restraining coloring of the images, enlarging a viewing angle and correcting contrast or color tone When the retardation plate is used, the retardation plate, the linear polarizing plate 3 and the liquid crystal cell 5 may be laminated with one another typically through the transparent adhesive layers similar to the above-described one.

In this image display device 2 in FIG. 2, another linear polarizing plate 6 is disposed on the rear surface side of the liquid crystal cell 5 in addition to the linear polarizing plate 3 which is disposed on the front surface side thereof, This linear polarizing plate 6 disposed on the rear surface side may be a plate similar to the linear polarizing plate 3 disposed on the front surface side of the liquid crystal cell, that is, a plate obtained by respectively laminating a protective film 62 on both surfaces of a polarizer film 61.

An illuminating device (not illustrated) composed of a light source, an optical guiding plate and others as well as a reflective plate (not illustrated) may further be disposed on a further rear side of the linear polarizing plate 6.

Further, a retardation plate (not illustrated) may be disposed between the linear polarizing plate 6 on the rear surface side and the liquid crystal cell 5 for the purpose of restraining coloring of the images, enlarging a viewing angle and correcting contrast or color tone. When the retardation plate is used, the retardation plate, the linear polarizing plate 6 and the liquid crystal cell 5 may be laminated with one another typically through the transparent adhesive layers similar to the above-described one.

The image display device 2 includes an antiglare surface having unevenness on the utmost surface 1 thereof. The antiglare surface having unevenness may be, for example, an uneven surface of a coat layer 4 disposed on the linear polarizing plate 3 serving as a substrate. Alternatively, the antiglare surface may be an uneven surface obtained by embossing the surface of the linear polarizing plate 3 serving as a substrate. Still alternatively, a commercially available linear polarizing plate having unevenness (such as "Sumikaran SQ1852-AG7" manufactured by Sumitomo Chemical Industry Co., Ltd.) may be used as the linear polarizing plate 3, and the surface thereof may be utilized as the antiglare surface. The antiglare surface having unevenness in the image display device 2 shown in FIG. 2 is a surface of a coat layer 4 which is disposed on the front surface side of the linear polarizing plate 3 (arranged on the front surface side) serving as a substrate. Such a coat layer 4 may be, for example, a cured layer made of a curable compound and particles dispersed therein.

Examples of the curable compound include a commonly used hard coating agent. The hard coating agent may be one typically used for providing a hard coating layer.

Examples of the particles to be dispersed in the cured layer include inorganic particles such as silica particles. Typically. the mount of the particles for use may be about 50 parts by weight or smaller, and preferably within the range of from about 1 part by weight to about 50 parts by weight, both based on 100 parts by weight of the cured layer.

When silica particles are used as the aforesaid particles, it is preferred to use a combination of silica gel and silica sol, since the unevenness formed by the combination looks fine and an antiglare surface having a high quality appearance is obtained thereby. Here, the silica gel refers to silica particles generally having a particle size of from about 1 to about 10 µm, and the silica sol refers to silica particles generally having a particle size of from about 5 to about 600 nm. Silica gel and silica sol which are commercially available can be utilized. When silica gel and silica sol are used in combination thereof, an mount of silica gel for use may be typically about 0.1 to about 30 parts by weight, and an mount of silica gel for use may be typically about 1 to about 30 parts by weight, both based on 100 parts by weight of the cured layer to be obtained. Typically, it is preferred that the total mount of silica gel and silica sol for use is within the range of about 50 parts by weight or less based on 100 parts by weight of the cured layer.

Such a coat layer 4 can be formed by applying a composition containing a curable compound and particles onto a surface of a linear polarizing plate 3 which works as a substrate, and then curing the composition. An applying method and a curing method to be adopted may be those generally used in the art, and are suitably selected depending on, for example the mounts of the curable compound and the particles to be used.

The linear polarizing plate 3 having such a coat layer 4 works as an antiglare linear polarizing plate which holds an antiglare surface having unevenness on one side of surface. In such a linear polarizing plate possessing an antiglare property, the antiglare surface having unevenness is a surface of the coat layer 4 which is disposed on one side of surface of the linear polarizing plate 3, and the coat layer 4 is a cured layer made from particles and a curable compound, wherein the particles are dispersed in the cured layer. This coat layer 4 typically has a haze (H) of about 30% or less.

In the image display device of the present Invention, the ratio (Sm/a) of the average spacing of roughness peak (Sm) of the unevenness of the antiglare surface to the pixel pitch (a) is about 0.4 or smaller, and preferably about 0.33 or smaller. When the ratio (Sm/a) exceeds 0.4, the "glittering" is liable to be generated, thereby leading to reduced visibility of the display screen. The ratio (Sm/a) may be typically about 0.1 or larger, and preferably about 0.2 or larger.

In order to set the ratio (Sm/a) to be about 0.4 or smaller, the average spacing of roughness peak (Sm) of the unevenness is suitably selected depending on the size of pixel pitch (a) of the liquid crystal cell used in the image display device. Since the pixel pitch (a) of the liquid crystal cell is about 10 to about 100 µm in the present invention, the average spacing of roughness peak (Sm) of the unevenness may be specifically set to fall within a range of from about 4 to about 40 µm. In the case that the surface of the coat layer 4, which is obtained by dispersing particles in a cured layer, is utilized as an antiglare surface as described above, the average spacing of roughness peak (Sm) of the unevenness may be set to fall within the range of from about 4 to about 40 µm by suitably adjusting the amount of the particles to be contained in the coat layer. When both silica gel and silica sol are used in combination thereof as the particles, the amounts of silica gel and silica sol to be used are adjusted to be suitable ones which are described above.

A center line average height (Ra) of the unevenness forming the antiglare surface may be typically about 0.5 µm or smaller. When the center line average height (Ra) exceeds 0.5 μm, the visibility of the display screen is liable to decrease. The center line average height (Ra) may be typically about 0.1 μm or larger.

Figure 3:
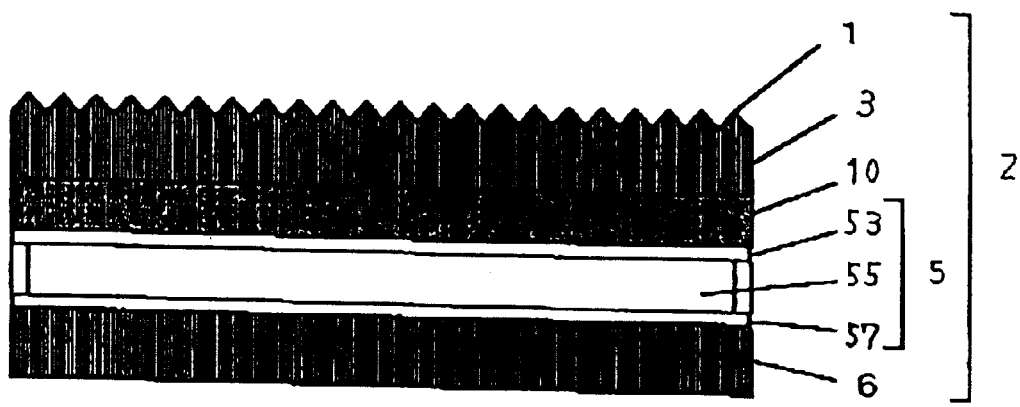
FIGS. 3 to 8 are cross sectional views of examples of image display devices (each comprising a light diffusing layer) of the present invention.
Figure 4:

FIG. 3 shows another example of an image display device of the present invention. The image display device 2 in FIG. 3 includes a linear polarizing plate 3, a light diffusing layer 10, a liquid crystal cell 5 and a linear polarizing plate 6 in this order in the direction from the front surface side to the rear surface side of the device. Further, FIG. 4 shows still another example of an image display device of the present invention. The image display device 2 in FIG. 4 includes a linear polarizing plate 3, a light diffusing layer 10 and a liquid crystal cell 5 in this order in the direction from the front surface side to the rear surface side of the device.

In the case that an image display device 2 is a transmission-type liquid crystal display device or a commonly-used reflectlon-type liquid crystal display device, a linear polarizing plate 6 is often disposed on the rear surface side of the liquid crystal cell 5, as shown in FIGS. 2 and 3. However, in the case that the image display device 2 is the commonly-used reflection-type image display device, the linear polarizing plate 6 may not be used in some cases on the rear surface side of the liquid crystal cell 5 since the electrode 58 on the rear surface side in the cell works as a reflective plate, as shown in FIG. 4.

The image display device 2 of the present invention may include a light diffusing layer 10 on the front surface side of the liquid crystal cell 5. An image display device having the light diffusing layer 10 to possess an internal haze of about 3 to about 50% by desirably restrains so-called "glittering". When the light diffusing layer 10 may be used, the light diffusing layer 10 is typically positioned at some place between the liquid crystal cell 5 and the antiglare surface 1. For example, in the case of an image display device having an antiglare surface on the surface of the linear polarizing plate 3 which is disposed on the front surface side of the liquid crystal cell 5, the light diffusing layer 10 is positioned between the liquid crystal cell 5 and the linear polarizing plate 3 on the front surface side of the device, as shown in FIGS. 3 and 4.

Figure 5:
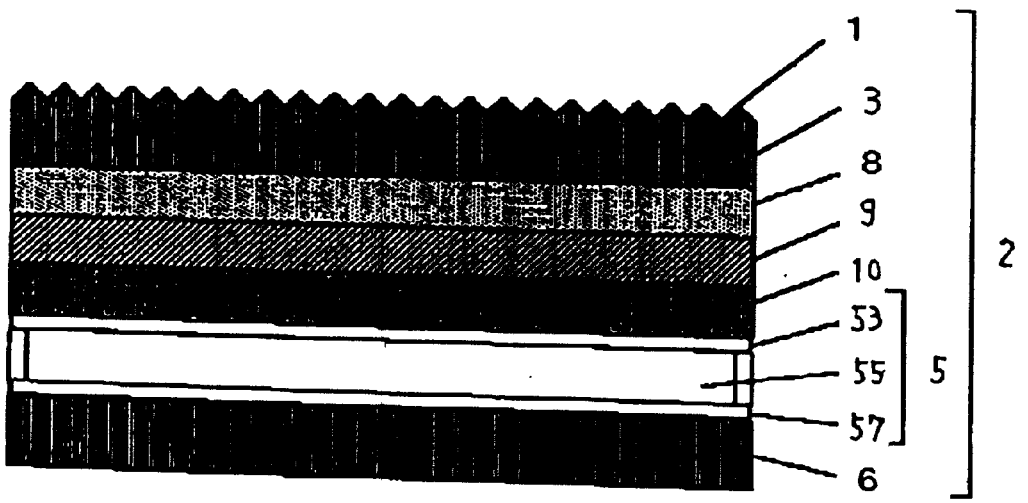
Figure 6:
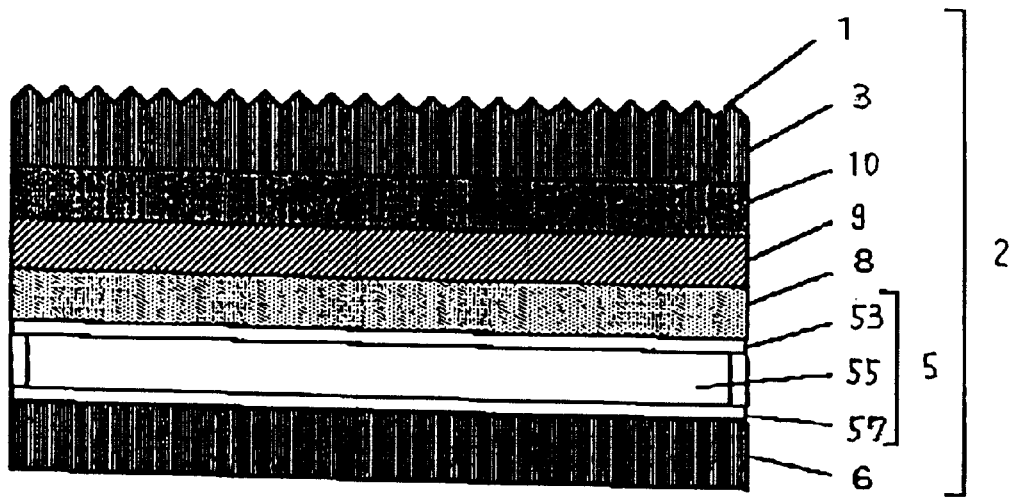
Figure 7:
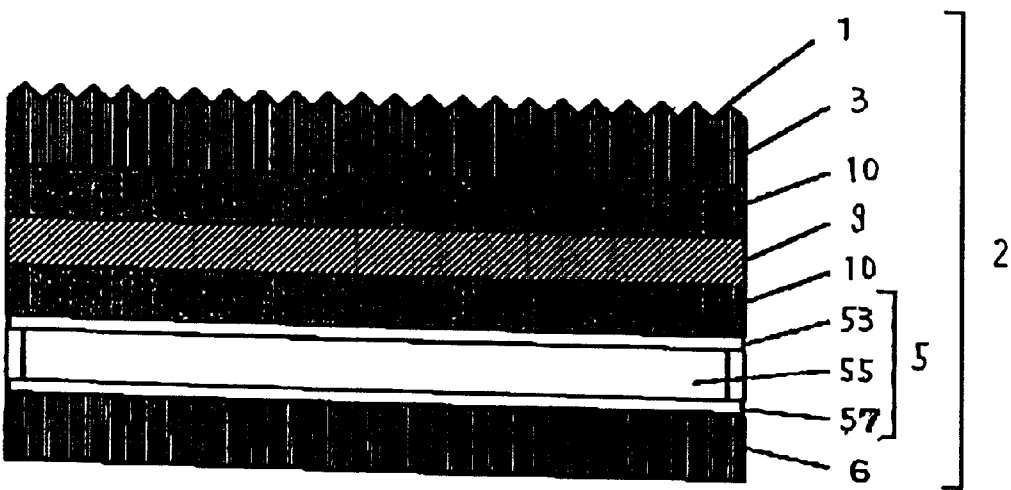
Figure 8:
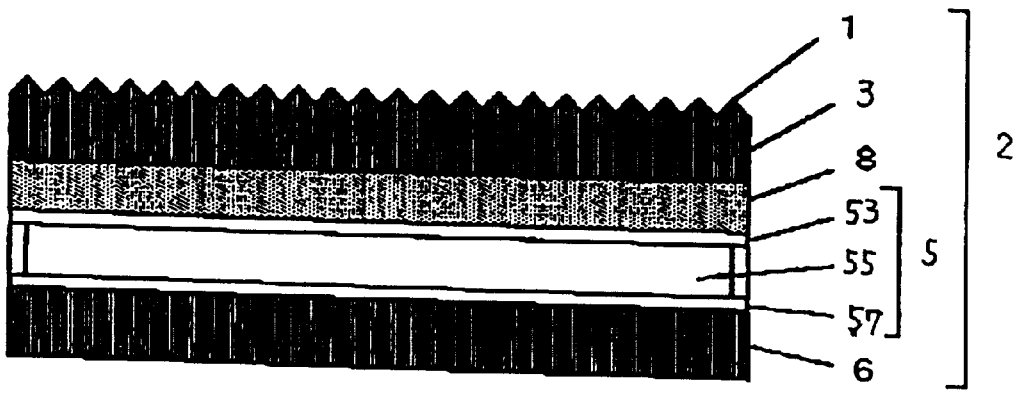

FIGS. 5 to 7 show still other examples of image display devices of the present invention. The image display device 2 in FIG. 5 includes a linear polarizing plate 3, an adhesive layer 8, a retardation plate 9, a light diffusing layer 10, a liquid crystal cell 5 and a linear polarizing plate 6 in this order in the direction from the front surface side to the rear surface side of the device. The image display device 2 in FIG. 6 includes a linear polarizing plate 3. a light diffusing layer 10. a retardation plate 9, an adhesive layer 8, a liquid crystal cell 5 and a linear polarizing plate 6 in this order in the direction from the front surface side to the rear surface side of the device. The image display device 2 in FIG. 7 includes a linear polarizing plate 3, a light diffusing layer 10, a retardation plate 9, a light diffusing layer 10, a liquid crystal cell 5 and a linear polarizing plate 6 in this order in the direction from the front surface side to the rear surface side of the device. As shown in FIGS. 5 to 7, there are cases in which a retardation plate 9 and others are disposed between the liquid crystal cell 5 and the linear polarizing plate 3 on the front surface side of the device. In such cases, the light diffusing layer 10 may be disposed between the liquid crystal cell 5 and the retardation plate 9 as shown in FIG. 5; or alternatively, the light diffusing layer 10 may be disposed between the retardation plate 9 and the linear polarizing plate 3 on the front surface side of the device as shown in FIG. 6; or still alternatively, the light diffusing layer 10 may be disposed between the liquid crystal cell 5 and the retardation plate 9 together with still another light diffusing layer 10 which is disposed between the retardation plate 9 and the linear polarizing plate 3 on the front surface side of the device as shown in FIG. 7.

The linear polarizing plate 3 on the front surface side of the device, the liquid crystal cell 5, the retardation plate 9 and others are laminated typically through an adhesive layer 8. In the case that the light diffusing layer 10 works as such an adhesive layer, it is not necessary to use an adhesive layer 8, which is preferred since the number of layers can be restricted to the minimum.

Examples of such an adhesive layer serving as a light diffusing layer include an adhesive layer which is made from an adhesive component and particles having a different refractive index from that of the adhesive component wherein the particles are dispersed in the adhesive component. The adhesive component constituting the adhesive layer may be typically a pressure sensitive adhesive (sticking agent). Examples of the adhesive include an acrylic pressure sensitive adhesive or a urethane pressure sensitive adhesive.

In the adhesive layer serving as the light diffusing layer, which is obtained by dispersing particles in an adhesive component, a refractive index of the particles should be different from that of the adhesive component. If both refractive indices are the same, the obtained layer does not function as a light diffusing layer. The difference in refractive index between the particles and the adhesive component is preferably about 0.2 to about 1.5. It is preferred that the refractive index of the particles is larger than the refractive index of the adhesive component. The particles may typically have an average particle size of from about 2 to about 7 μm. An amount of the particles contained in the adhesive layer may be typically about 0.1 to about 10 parts by weight based on 100 parts by weight of the adhesive component. The particles may typically have a spherical shape.

When the image display device of the present invention comprises a light diffusing layer and has the internal haze of from about 3 to about 50%, one light diffusing layer may be used so as to adjust the internal haze of the device to be about 3 to about 50%, or alternatively two or more light diffusing layers may be used so as to provide such an internal haze. The light diffusing layer utilized in the present invention may typically have a haze of about 1 to about 50%.

A thickness of the light diffusing layer is not specifically limited as long as the obtained image display device has the internal haze of from about 3 to about 50%. The thickness may be typically about 10 to about 100 μm. When the light diffusing layer works as an adhesive layer, the thickness may be typically about 10 to about 50 μm.

The image display device of the present invention comprises an antiglare surface having unevenness. In order to keep the antiglare performance of the antiglare surface and to keep good visibility, the interval between a convexity and a concavity in the unevenness and the height of the convexity and the concavity are preferably within certain ranges. Specifically, it is preferred that the interval may be about 4 to about 40 μm in terms of average spacing of roughness peak, and the height may be preferably about 0.5 μm or smaller in terms of center line average height of the unevenness.

The convexity and the concavity in the unevenness themselves have a function as a fine convex lens or a fine concave lens as well as the function of antiglare performance. Even if such a convex lens or a concave lens are formed on the utmost surface of the image display device, each pixel is not observed with being enlarged or reduced in size by the convex lens or the concave lens provided that the size of one pixel is sufficiently larger than the size of the convex lens or the concave lens. However, if the size of pixel pitch is enlarged for enlarging the size of pixel, an image display device which performs highly fine image is unlikely to be obtained.

On the other hand, if the size of pixel pitch is reduced in order to obtain an Image display device which performs highly fine image, the size of pixel turns approximately equal to or smaller than the size of the convex lens or the concave lens, which results in that the individual pixels are observed with being enlarged or reduced in size. Such enlargement or reduce in size of individual pixels is observed as a so-called "glittering" in the image display device as a whole. In order to reduce such glittering, it may be considered to adjust only the interval between the convexity and the concavity in the unevenness or the like of the antiglare surface; however, in a highly-fine image display device, the antiglare performance may possibly decrease in some cases, thereby failing to provide a function as an antiglare surface. In the present invention, the glittering is reduced by setting the size of the pixel pitch and the ratio of the average spacing of roughness peak of the unevenness of the antiglare surface to the pixel pitch to be within each specific range.

Further, in the present invention, when a light diffusing layer is disposed in the image display device, light from individual pixels is diffused during passing through the light diffusing layer, which results in that the degree of such enlargement or such reduce due to the convex lens or the concave lens is restrained, thereby further reducing the glittering The Image display device of the present invention generates little glittering, and is excellent in the visibility of the displayed images. For example, the device is preferably used as an image display device such as a monitor of a video camera, a television set or a monitor of a personal computer.

The image display device of the present invention is capable of displaying images which have high density with little reflection of surrounding scenery and little generation of "glittering", so that it is excellent in visibility of the display screen thereof.

EXAMPLES

The present invention is described in more detail by following Examples, which should not be construed as a limitation upon the scope of the present invention.

Here, the average spacing of roughness peak (Sm) of the unevenness and the center line average height (Ra) of the surface of a linear polarizing plate were measured by means of a surface shape measuring apparatus ("Surfcom" manufactured by Toyo Seimitsu Co., Ltd.) in accordance with methods in JIS B0601.

The haze (H) was measured by means of "Haze Computer HGM-2DP (manufactured by Suga Tester Co., Ltd.) in accordance with methods in JIS K7105.

Example 1

A mixture was prepared by mixing 100 parts by weight of a curable compound (that is a urethane acrylate compound obtained by reaction of pentaerythritol triacrylate and hexamethylene diisocyanate), 10 parts by weight of silica gel (Cylicia 310, which is manufactured by Fuji Cylicia Chemical Co., Ltd. and has an average particle size of 1.4 $\mu$m), 10 parts by weight of silica sol (Silica Sol IPA-ST, which is manufactured by Nissan Chemical Industry Co., Ltd. and has an average particle size of from 10 to 20 $\mu$m), 5 parts by weight of a photopolymerization initiator (Irgacure-184, manufactured by Chiba Speciality Chemicals Co., Ltd.), 2 parts by weight of an amine compound (Adecastab LA-63P, manufactured by Asahi Denka Kogyo Co., Ltd. ) and 300 parts by weight of a solvent (ethyl cellosolve). The mixture was applied on one side of surface of a triacetylcellulose (TAC) film (Fujitac FT80UVS, which is manufactured by Fuji Photography Film Co., Ltd. and has a thickness of 80 $\mu$m) by means of a bar coater (#8). followed by drying at 70° C. for 1.5 minutes. Then, ultraviolet rays were radiated to the film for 5 seconds from a distance of 150 mm with an intensity of 80 W/cm by means of a high pressure mercury lamp, to form a coat layer of a cured layer.

A polarizer film of polyvinyl alcohol resin, in which iodine is adsorbed and oriented, was laminated on the above-obtained TAC film so that the polarizer film was placed on the surface opposite to the surface where the coat layer is formed, using a polyvinyl alcohol (PVA) adhesive, and then another TAC film (having a surface saponified with an aqueous solution of potassium hydroxide and having a thickness of 80 $\mu$m) was superimposed thereon using the PVA adhesive, to obtain a linear polarizing plate having a coat layer on one side of surface thereof.

The average spacing of roughness peak (Sm) of the unevenness and the center line average height (Ra) of the coat layer which the obtained linear polarizing plate has are shown in Table 1. Further, the haze (H) of the obtained linear polarizing plate is also shown in Table 1.

The linear polarizing plate was laminated on the front surface side of a transmission-type color liquid crystal cell (having a screen size of 2.5 inch with 180.000 pixels which have a pixel pitch (a) of 60 $\mu$m) using an acrylic pressure sensitive adhesive so that the coat layer does not face the cell, to obtain a device. The obtained device was mounted on a light box, and the state of the image display region of the device was observed by eye from the front surface side of the device. As a result, little "glittering" was observed.

A linear polarizing plate is disposed onto the rear surface side of the color liquid crystal cell in the above-obtained device, to obtain an image display device. In the device, little "glittering" is observed.

Example 2

The same procedure was conducted as in Example 1 except that, in preparing a mixture for providing a coat layer, the amount of silica gel was changed from 10 parts by weight to 9 parts by weight, the amount of silica sol was changed from 10 parts by weight to 9 parts by weight, the amount of mine compound was changed from 2 parts by weight to 1.8 parts by weight and the amount of solvent was changed from 300 parts by weight to 260 parts by weight. to obtain a liner polarizing plate.

The average spacing of roughness peak (Sm) of the unevenness and the center line average height (Ra) of the coat layer which the obtained linear polarizing plate has are shown in Table 1. Further, the haze (H) of the obtained linear polarizing plate is also shown in Table 1.

The obtained linear polarizing plate was laminated on the front surface side of the same transmission-type color liquid crystal cell as used in Example 1, using an acrylic pressure sensitive adhesive in the same manner as in Example 1, to obtain a device. The obtained device was mounted on a light box, and the state of the image display region of the device was observed by eye from the front surface side of the device. As a result, little "glittering" was observed.

A linear polarizing plate is disposed onto the rear surface side of the color liquid crystal cell in the above-obtained device, to obtain an image display device. In the device, little "glittering" is observed.

Example 3

The same procedure was conducted as in Example 1 except that, in preparing a mixture for providing a coat layer, the amount of silica gel was changed from 10 parts by weight to 8.5 parts by weight, the amount of silica sol was changed from 10 parts by weight to 8.5 parts by weight, the amount of mine compound was changed from 2 parts by weight to 1.7 parts by weight and the amount of solvent was changed from 300 parts by weight to 240 parts by weight, to obtain a liner polarizing plate.

The average spacing of roughness peak (Sm) of the unevenness and the center line average height (Ra) of the coat layer which the obtained linear polarizing plate has are shown in Table 1. Further, the haze (H) of the obtained linear polarizing plate is also shown in Table 1.

The obtained linear polarizing plate was laminated on the front surface side of the same transmission-type color liquid crystal cell as used in Example 1, using an acrylic pressure sensitive adhesive in the same manner as in Example 1, to obtain a device. The obtained device was mounted on a light box, and the state of the image display region of the device was observed by eye from the front surface side of the device. As a result, slight "glittering" was observed.

A linear polarizing plate is disposed onto the rear surface side of the color liquid crystal cell in the above-obtained device, to obtain an image display device. In the device, slight "glittering" is observed but there is no problem in practical use.

Example 4

The same procedure was conducted as in Example 1 except that, in preparing a mixture for providing a coat layer, the amount of silica gel was changed from 10 parts by weight to 7.5 parts by weight, the amount of silica sol was changed from 10 parts by weight to 7.5 parts by weight, the amount of mine compound was changed from 2 parts by weight to 1.5 parts by weight and the amount of solvent was changed from 300 parts by weight to 200 parts by weight, to obtain a liner polarizing plate.

The average spacing of roughness peak (Sm) of the unevenness and the center line average height (Ra) of the coat layer which the obtained linear polarizing plate has are shown in Table 1. Further, the haze (H) of the obtained linear polarizing plate is also shown in Table 1.

The obtained linear polarizing plate was laminated on the front surface side of the same transmission-type color liquid crystal cell as used in Example 1, using an acrylic pressure sensitive adhesive in the same manner as in Example 1, to obtain a device. The obtained device was mounted on a light box, and the state of the image display region of the device was observed by eye from the front surface side of the device. As a result, slight "glittering" was observed.

A linear polarizing plate is disposed onto the rear surface side of the color liquid crystal cell in the above-obtained device, to obtain an image display device. In the device, slight "glittering" is observed but there is no problem in practical use.

Comparable Example 1

The same procedure was conducted as in Example 1 except that, in preparing a mixture for providing a coat layer, the amount of silica gel was changed from 10 parts by weight to 7.2 parts by weight, the amount of silica sol was changed from 10 parts by weight to 7.2 parts by weight, the amount of mine compound was changed from 2 parts by weight to 1.4 parts by weight and the amount of solvent was changed from 300 parts by weight to 270 parts by weight, to obtain a liner polarizing plate.

The average spacing of roughness peak (Sm) of the unevenness and the center line average height (Ra) of the coat layer which the obtained linear polarizing plate has are shown in Table 1. Further, the haze (H) of the obtained linear polarizing plate is also shown in Table 1.

The obtained linear polarizing plate was laminated on the front surface side of the same transmission-type color liquid crystal cell as used in Example 1. using an acrylic pressure sensitive adhesive in the same manner as in Example 1, to obtain a device. The obtained device was mounted on a light box, and the state of the image display region of the device was observed by eye from the front surface side of the device. As a result, definite "glittering" was observed.

A linear polarizing plate is disposed onto the rear surface side of the color liquid crystal cell in the above-obtained device, to obtain an image display device. In the device, "glittering" is observed, and the displayed image is not clearly visible.

Comparative Example 2

The same procedure was conducted as in Example 1 except that, in preparing a mixture for prosiding a coat layer, the amount of silica gel was changed from 10 parts by weight to 6.9 parts by weight, the amount of silica sol was changed from 10 parts by weight to 6.9 parts by weight, the amount of mine compound was changed from 2 parts by weight to 1.4 parts by weight and the amount of solvent was changed from 300 parts by weight to 260 parts by weight, to obtain a liner polarizing plate.

The average spacing of roughness peak (Sm) of the unevenness and the center line average height (Ra) of the coat layer which the obtained linear polarizing plate has are shown in Table 1. Further, the haze (H) of the obtained linear polarizing plate is also shown in Table 1.

The obtained linear polarizing plate was laminated on the front surface side of the same transmission-type color liquid crystal cell as used in Example 1, using an acrylic pressure sensitive adhesive in the same manner as in Example 1, to obtain a device. The obtained device was mounted on a light box, and the state of the image display region of the device was observed by eye from the front surface side of the device. As a result, strong "glittering" was observed.

A linear polarizing plate is disposed onto the rear surface side of the color liquid crystal cell in the above-obtained device, to obtain an image display device. In the device, "glittering" is observed, and the displayed image is not clearly visible.

TABLE 1

| Examples | Sm | Ra | H | Observation result* |
| --- | --- | --- | --- | --- |
| Example 1 | 16.2 | 0.41 | 29 | ◉ |
| Example 2 | 18.6 | 0.39 | 25 | ◉ |
| Example 3 | 19.9 | 0.23 | 13 | ○ |
| Example 4 | 21.7 | 0.24 | 9.1 | ○ |
| Comparative Example 1 | 28.9 | 0.35 | 11.5 | Δ |

TABLE 1-continued

| Examples | Sm | Ra | H | Observation result* |
|---|---|---|---|---|
| Comparative Example 2 | 33.4 | 0.36 | 9.6 | x |

*⊚: Little "glittering" is observed.
○: Slight "glittering" is observed.
Δ: Definite "glittering" is observed.
x: Strong "glittering" is observed.

Example 5

A mixture of 100 parts by weight of an acrylic pressure sensitive adhesive (having a refractive index of 1.47) and 2 parts by weight of cross-linked polystyrene beads (having a spherical shape, an average particle size of 4 μm and a refractive index of 1.59) was prepared to obtain a pressure sensitive adhesive composition.

The above-obtained pressure sensitive adhesive composition was applied (to thickness of 25 μm) onto the surface, on which there is no unevenness, of a linear polarizing plate obtained in the same manner as in Example 3, to provide a pressure sensitive adhesive layer which works as a light diffusing layer. The adhesive layer had an internal haze of 25%.

The linear polarizing plate, on which the pressure sensitive adhesive layer was thus provided, was laminated onto the front surface side of the same transmission-type color liquid crystal cell as used in Example 1 through the pressure sensitive adhesive layer to obtain a liquid crystal display device. The obtained device was mounted on a light box, and the state of the image display region of the device was observed by eye from the front surface side of the device. As a result, little "glittering" was observed.

Example 6

The same procedure was conducted as in Example 5 except that, in preparing a mixture for providing a pressure sensitive adhesive composition, 0.5 part by weight of beads of melmine-formaldehyde condensed product (Eposter S12, manufactured by Nippon Catalyst Co., Ltd., which has a spherical shape, an average particle size of 1.2 μm and a refractive index of 1.57) was used instead of using the cross-linked polystyrene beads, to obtain a liquid crystal display device. The obtained device was mounted on a light box, and the state of the image display region of the device was observed by eye from the front surface side of the device. As a result, little "glittering" was observed.

Example 7

A pressure sensitive adhesive composition was prepared in the same manner as in Example 5. The obtained pressure sensitive adhesive composition was applied (to thickness of 25 μm) on the surface, on which there is no unevenness, of a linear polarizing plate obtained in the same manner as in Example 4, to provide a pressure sensitive adhesive layer which works as a light diffusing layer.

The linear polarizing plate, on which the pressure sensitive adhesive layer was thus provided, was laminated onto the front surface side of the same transmission-type color liquid crystal cell as used in Example 1 through the pressure sensitive adhesive layer to obtain a liquid crystal display device. The obtained device was mounted on a light box, and the state of the image display region of the device was observed by eye from the front surface side of the device As a result, little "glittering" was observed.

Example 8

The same procedure was conducted as in Example 7 except that the same pressure sensitive adhesive composition as in Example 6 was used, instead of using the same pressure sensitive adhesive composition as in Example 5, to obtain a liquid crystal display device. The obtained device was mounted on a light box, and the state of the image display region of the device was observed by eye from the front surface side of the device. As a result, little "glittering" was observed.

What is claimed is:

1. An image display device which comprises an antiglare surface having unevenness and pixels having a minimum pixel pitch (a) of from about 10 to about 100 μm, wherein a ratio (Sm/a) of an average spacing of roughness peak (Sm) of said unevenness to the minimum pixel pitch (a) is about 0.4 or smaller.

2. An image display device according to claim 1, wherein said antiglare surface is a surface of a coat layer disposed on a surface of a substrate, and said coat layer is a cured layer made from a curable compound and particles dispersed in the curable compound.

3. An image display device according to claim 2, wherein the particles are those of silica gel and silica sol.

4. An image display device according to claim 2, wherein said coat layer has a haze of about 30% or smaller.

5. An image display device according to claim 1, wherein the unevenness of the antiglare surface has a center line average height of about 0.5 μm or smaller.

6. An antiglare linear polarizing plate having an antiglare surface on one surface of a linear polarizing plate, said antiglare surface having unevenness and having an average spacing of roughness peak (Sm) of the unevenness of about 4 to about 40 μm.

7. An image display device according to claim 1, further comprising a light diffusing layer and having an internal haze of about 3 to about 50%.

8. An image display device according to claim 7, wherein said light diffusing layer has a haze of about 3 to about 50.

9. An image display device according to claim 7, wherein said light diffusing layer is an adhesive layer made of an adhesive component and particles having a refractive index which is different from a refractive index of said adhesive component.

10. An image display device according to claim 9, wherein a difference in refractive index between the adhesive component and the particles is about 0.02 or larger.

11. An image display device according to claim 9, wherein said particles have an average particle size of about 2 to about 7 μm.

* * * * *